United States Patent
Zimmer et al.

(10) Patent No.: US 7,206,931 B2
(45) Date of Patent: Apr. 17, 2007

(54) AGGRESSIVE CONTENT PRE-FETCHING DURING PRE-BOOT RUNTIME TO SUPPORT SPEEDY OS BOOTING

(75) Inventors: Vincent J. Zimmer, Federal Way, WA (US); Michael A. Rothman, Gig Harbor, WA (US); Mark S. Doran, Olympia, WA (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/499,336

(22) Filed: Aug. 4, 2006

(65) Prior Publication Data

US 2006/0271775 A1 Nov. 30, 2006

Related U.S. Application Data

(62) Division of application No. 10/675,826, filed on Sep. 30, 2003.

(51) Int. Cl.
*G06F 15/177* (2006.01)
(52) U.S. Cl. ............................... 713/1; 713/2; 715/526
(58) Field of Classification Search ............ 713/1, 713/2; 715/526
See application file for complete search history.

(56) References Cited

U.S. PATENT DOCUMENTS

| 5,600,766 | A | 2/1997 | Deckys et al. |
| 5,796,971 | A | 8/1998 | Emberson |
| 6,934,809 | B2 * | 8/2005 | Tremblay et al. ........... 711/137 |
| 6,993,645 | B2 * | 1/2006 | Joseph et al. .................. 713/2 |
| 7,000,077 | B2 | 2/2006 | Grimsrud et al. |
| 2004/0181656 | A1 | 9/2004 | Stern et al. |

OTHER PUBLICATIONS

U.S. Appl. No. 11/499,001, Office Action mailed Sep. 18, 2006.

* cited by examiner

*Primary Examiner*—A. Elamin
(74) *Attorney, Agent, or Firm*—Blakely, Sokoloff, Taylor & Zafman LLP

(57) ABSTRACT

A method and system for content pre-fetching during a processing system pre-boot runtime. First, it is determined when a processor of a processing system is in one of a busy wait state and an idle state during a pre-boot runtime of the processing system. Then, content is pre-fetched from a data storage unit of the processing system. The content is pre-fetched based upon a pre-fetch profile. The content is loaded into system memory of the processing system.

13 Claims, 9 Drawing Sheets

AGGRESSIVE CONTENT PRE-FETCHING DURING PRE-BOOT RUNTIME TO SUPPORT SPEEDY OS BOOTING

CROSS-REFERENCE TO RELATED APPLICATIONS

This application is a divisional of, and claims priority under 35 U.S.C. § 120 from, co-pending U.S. patent application Ser. No. 10/675,826, filed Sep. 30, 2003.

TECHNICAL FIELD

This disclosure relates generally to content pre-fetching, and in particular, relates to content pre-fetching during a pre-boot runtime to support speedy operating system booting.

BACKGROUND INFORMATION

In the field of computers, there has been a long felt need to reduce the boot time of computers. In fact, waiting for a computer to boot is an irritating nuisance almost universally acknowledged by all computer users.

One reason for extended pre-boot runtimes are wasted processing cycles. Typically, during the pre-boot runtime the processor is executing in a single threaded environment. As such, the processor spends a considerable amount of time simply waiting or idle. For example, when initializing a keyboard controller, the processor sends instructions to the keyboard controller to commence its initialization and then "busy" waits for the keyboard controller to complete. As mentioned, the typical pre-boot environment is single threaded. Therefore, during this busy wait period the processor does not proceed to the next execution task, but rather, waits until the keyboard controller completes its initialization.

During the pre-boot runtime, the processor spends a considerable amount of time (e.g., 70%) busy waiting for any number of hardware devices, such as waiting for the hard disk drive to return requested data, waiting for input/output ("I/O") ports, and the like. Furthermore, considerable time is lost busy waiting for user inputs (e.g., logon ID and password). All this busy waiting constitutes wasted processing power.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for aggressive content pre-fetching during a pre-boot runtime to support speedy operating system ("OS") booting are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Busy waiting" is defined herein as the act of intentionally stalling a processor or causing the processor to repeat a simple task for the purpose of waiting.

In short, embodiments of the present invention include a system and method to advantageously use the busy waiting periods and/or idle time during the pre-boot runtime to pre-fetch content from data storage units into system memory. Additionally, embodiments of the present invention include a system and method to determine which content should be pre-fetched during the busy wait periods. These and other embodiments are described in detail below.

Figure 1:
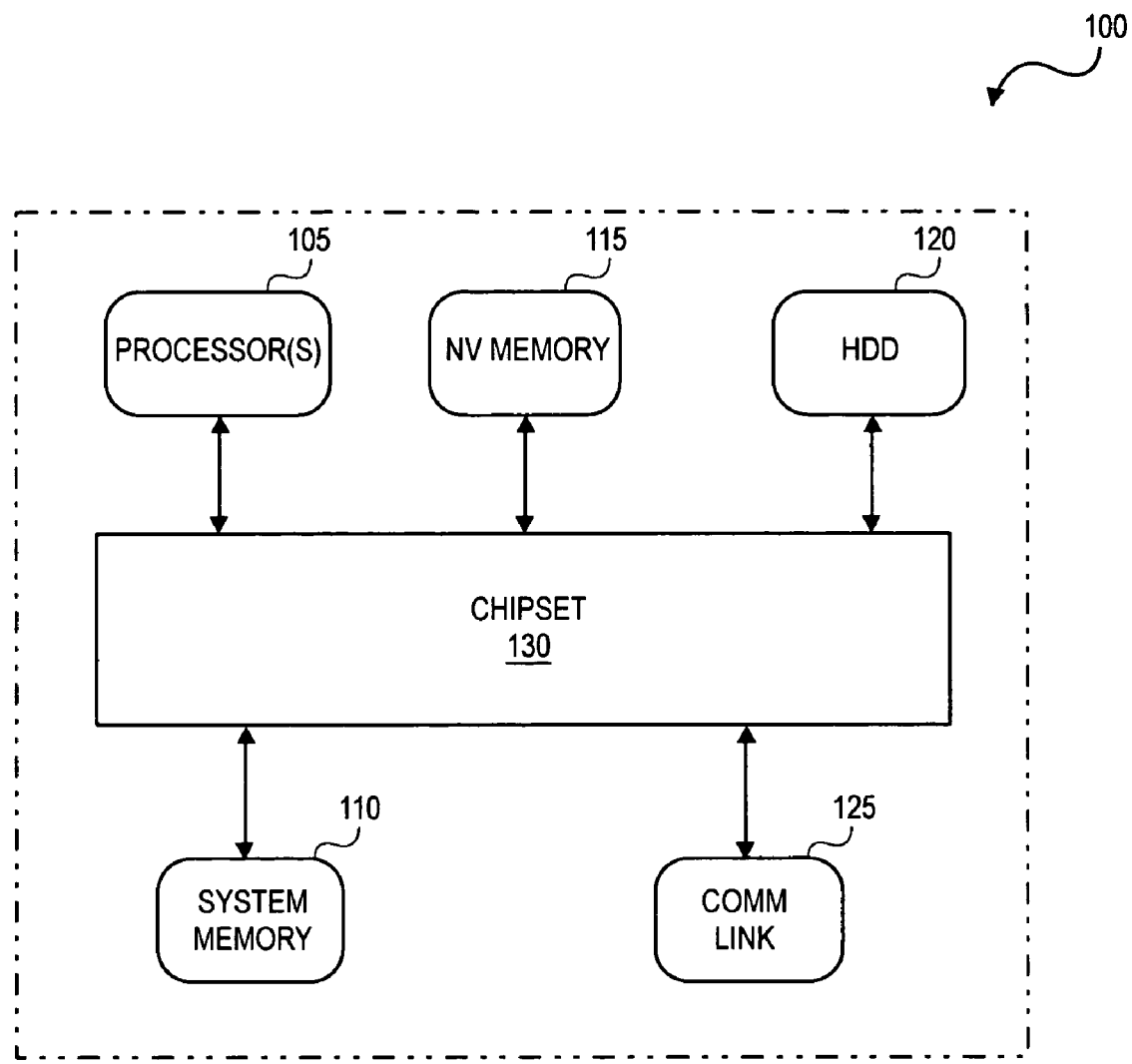
FIG. 1 is a block diagram illustrating a processing system to implement aggressive content pre-fetching during a pre-boot runtime, in accordance with an embodiment of the present invention.

FIG. 1 is a block diagram illustrating a processing system 100 to implement aggressive content pre-fetching during a pre-boot runtime, in accordance with an embodiment of the present invention. The illustrated embodiment of processing system 100 includes one or more processors (or central processing units) 105, system memory 110, nonvolatile ("NV") memory 115, a hard disk drive ("HDD") 120, an optional communication link 125, and a chipset 130.

The elements of processing system 100 are interconnected as follows. Processor 105 is communicatively coupled to system memory 110, NV memory 115, HDD 120, and communication link 125, via chipset 130 to send and to received instructions thereto/therefrom. In one embodiment, NV memory 115 is a flash memory device. In other embodiments, NV memory 115 includes any one of read only memory ("ROM"), programmable ROM, erasable programmable ROM, electrically erasable programmable ROM, or the like. In one embodiment, system memory 110 includes random access memory ("RAM"). In one embodiment, communication link 125 includes a network interface card ("NIC"). HDD 120 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although HDD 120 is illustrated as internal to processing system 100; however, HDD 120 may be external coupled to processing system 100.

It should be appreciated that various other elements of processing system 100 have been excluded from FIG. 1 and this discussion for the purposes of clarity. For example, processing system 100 may further include a graphics card or additional HDDs or other persistent data storage devices (e.g., tape drive). Chipset 130 may also include a system bus and various other data buses for interconnecting subcomponents, such as a memory controller hub and an input/output ("I/O") controller hub, as well as data buses for connecting peripheral devices to chipset 130.

Figure 2:
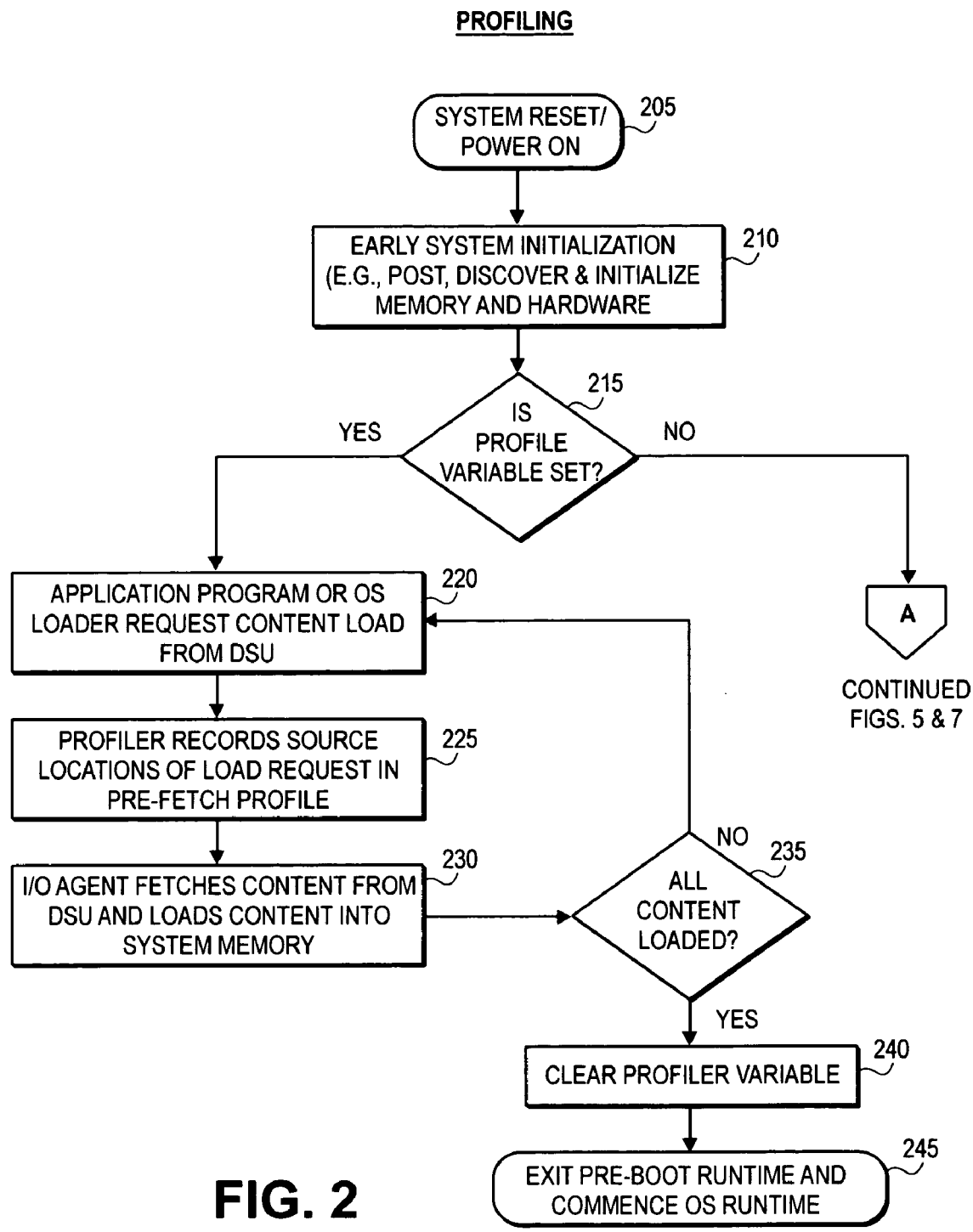
FIG. 2 is a flow chart illustrating a process to create a pre-fetch profile to implement aggressive content pre-fetching during a pre-boot runtime, in accordance with an embodiment of the present invention.
Figure 3:
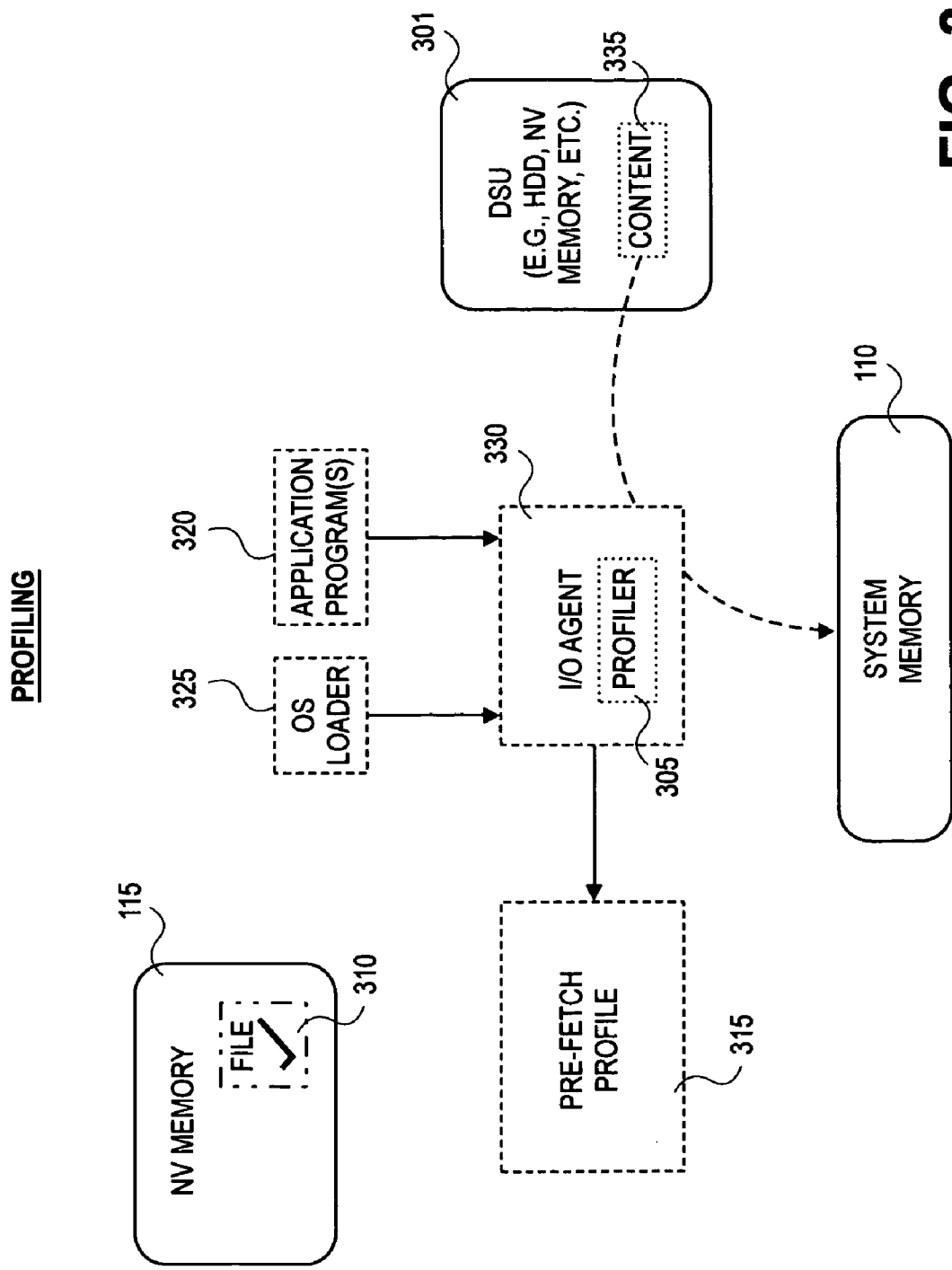
FIG. 3 is a block diagram illustrating data flow during a profiling process, in accordance with an embodiment of the present invention.

FIG. 2 is flow chart illustrating a process 200 to create a pre-fetch profile to implement aggressive content pre-fetching during a pre-boot runtime, in accordance with an embodiment of the present invention. Process 200 is described in connection with FIG. 3. FIG. 3 is a block diagram illustrating data flow during process 200. FIG. 3 includes a data storage unit ("DSU") 301. DSU 301 represents any persistent data storage unit of processing system 100, such as HDD 120 and even NV memory 115. NV memory 115 has been illustrated as separate from DSU 301 for the sake of clarity. Furthermore for the sake of this discussion, software/firmware entities such as a profiler 305, a pre-fetch profile 315, an application program 320, an OS loader 325, and an I/O agent 330 have been illustrated as external to the hardware components in which they are actually stored or executed.

Returning to FIG. 2, in a process block 205, processing system 100 is power cycled. Power cycling processing system 100 includes a reset event or a power on event. In a processing block 210, processing system 100 executes early system initialization tasks. Typically, early system initialization includes tasks such as a power on self test ("POST"), discovering memory resources (e.g., system memory 110, NV memory 115), initializing the memory resources, discovering platform hardware, initializing the platform hardware, and the like.

In a decision block 215, profiler 305 determines whether a profile variable 310 is set. In short, profiler 305 acts to create a pre-fetch profile 315, as described below. Profiler 305 is enabled if profile variable 310 is set. Typically, profiler 305 will be initially stored in NV memory 115 and transferred into system memory 110 during operation of processing system 100. In one embodiment, profiler 305 is loaded into system memory 110 in response to profile variable 310 being set. Alternatively, profiler 305 may be stored in any persistent data storage device, such as HDD 120. Furthermore, profiler 305 may be executed directly from NV memory 115 or HDD 120, though doing so may considerably slow down execution of process 200. In one embodiment, pre-fetch variable 310 is a variable having one of two states (e.g., set and clear) stored within NV memory 115. In other embodiments, profile variable 310 is stored within any persistent memory device coupled to processor 105. If profile variable 310 is set, process 200 continues to a process block 220.

In process block 220, application program 320 or OS loader 325 requests I/O agent 330 to load content 335 stored on DSU 120 into system memory 110. I/O agent 330 is a software/firmware I/O interface between various hardware components of processing system 100 and software/firmware modules executing thereon. Software/firmware applications (e.g., application program 320, OS loader 325, etc.) use the services provided by I/O agent 330 to transfer data or files from one location within processing system 100 to another.

In one embodiment, I/O agent 330 is a block I/O executing within an extensible firmware framework standard known as the Extensible Firmware Interface ("EFI") (specifications and examples of which may be found at http://developer.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., NV memory 115). More particularly, EFI enables firmware, in the form of firmware modules and drivers, to be loaded from a variety of different resources, including primary and secondary flash devices, ROMs, various persistent storage devices (e.g., hard disks, CD ROMs, etc.), and even over computer networks.

Application program 320 may be any software/firmware entity executing on processing system 100. In one embodiment, application program 320 is a pre-boot application, which is loaded and executed during a boot-up phase (i.e., start-up phase) of processing system 100. Similarly, OS loader 325 is loaded from DSU 301 and executed during the boot-up phase of processing system 100. OS loader 325 is executed by processing system 100 to begin loading portions of an OS from DSU 301, such as the OS kernel, device drivers, application programming interfaces ("APIs"), and the like, into system memory 110. Each of application program 320 and OS loader 325 may request I/O agent 330 to load and/or execute content 335 from DSU 301, which may in turn request I/O agent 330 to load other content from DSU 301. In fact, application program 320 and OS loader 325 are themselves content loaded from DSU 301. Content 335 may include instructions, data, files, applications, drivers, and the like, loaded by processing system 100 into system memory 110 during a boot-up or boot-up phase of processing system 100.

Returning to FIG. 2, in process block 220, one of application program 320 and OS loader 325 requests I/O agent 330 to load a portion of content 335 from DSU 301 into system memory 110. In a process block 225, profiler 305 records a source location of the load request into pre-fetch profile 315. In the illustrated case, the source location of the load request would be the location of content 335 stored on DSU 301. For example, the source location of content 335 could be a logical block address ("LBA") on HDD 120, a memory address or an address location in NV memory 115.

In a process block 230, I/O agent 330 executes the requested load of content 335 into system memory 110, illustrated by arrow 340. In a decision block 235, process 200 loops back to process block 220 and continues from there until all of content 335 requested by application program(s) 320 or OS loader 325 has been loaded into system memory 110 and its source locations saved in pre-fetch profile 315. Once all of content 335 has been loaded, process 200 continues to a process block 240. In process block 240, profiler 305 clears profiler variable 310, signifying that profiling has completed and pre-fetch profile 315 is complete. In a process block 245, the pre-boot runtime is completed and the OS runtime commences. In one embodiment, the pre-boot runtime is completed upon execution of an "exit boot services" instruction.

Profiler 305 is illustrated in FIG. 3 within I/O agent 330 to indicate that in one embodiment, profiler 305 is a functional component of I/O agent 330. However, in other embodiments, profiler 305 may be an independent entity that performs the functionality described herein in collaboration with I/O agent 330.

Process 200 represents a setup process for creating pre-fetch profile 315 for future use, as described below. In other words, process 200 is executed during an initial boot of a particular OS to create a pre-fetch profile of content loaded from DSU 301 for that particular OS. In subsequent boots, the pre-fetch profile created by process 200 is used to pre-fetch content 335 into system memory 110 to hasten the boot-up phase for the particular OS. Processing 200 may be repeated randomly, at preset intervals, when it is determined that content 335 has substantially changed, or at a user request to update the pre-fetch profile. A pre-fetch profile for a particular OS may change over time as the user installs new patches, updates, or applications on the OS or BIOS.

Figure 4:
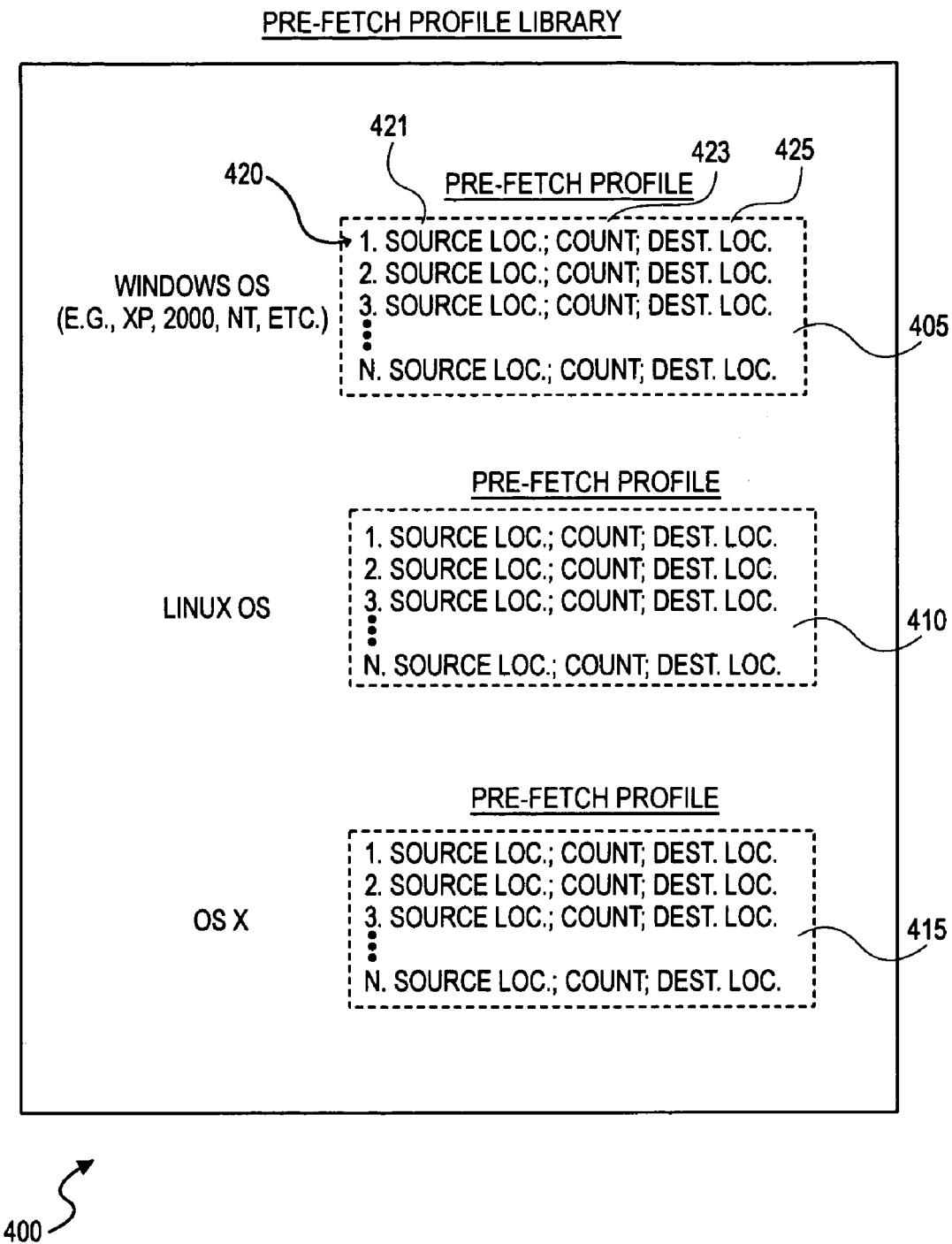
FIG. 4 is a diagram illustrating a pre-fetch profile library including multiple pre-fetch profiles to implement aggressive content pre-fetching for multiple operating systems, in accordance with an embodiment of the present invention.

FIG. 4 is a diagram illustrating a pre-fetch profile library 400 including multiple pre-fetch profiles, such as pre-fetch profile 315, in accordance with an embodiment of the present invention. The illustrated embodiment of pre-fetch profile library 400 includes a Windows™ OS pre-fetch profile 405, a Linux OS pre-fetch profile 410, and an OS X profile 415 (representing various other current or after developed OS's).

Pre-fetch profile library 400 may include any number of pre-fetch profiles, including only one. In one embodiment, when profiler 305 records source locations of content 335 into pre-fetch profile 315, pre-fetch profile 315 is saved to pre-fetch profile library 400 and indexed with the OS being booted by processing system 100 at the time. Thus, embodiments of the present invention support aggressive content pre-fetching in processing systems having multiple OS's or boot options.

Any number of techniques may be used to encode pre-fetch profiles 405, 410, and 415. For example, FIG. 4 illustrates a blocking method to encode pre-fetch profiles 405, 410, and 415. In this technique, contiguous LBAs on DSU 301 are grouped within a single entry. For example, entry 420 of pre-fetch profile 405 includes three values. A first value 421 of entry 420 is a source location of the first LBA of several contiguous LBAs. A second value 423 is a count indicating the number of contiguous LBAs. A third value 425 is a destination location. The destination location indicates to I/O agent 330 where the portion of the pre-fetched content 335 addressed by entry 420 should be loaded in system memory 110 (described below).

Another technique of encoding pre-fetch profiles 405, 410, and 415 is a one-to-one method. Using the one-to-one method, each LBA to be referenced within a pre-fetch profile has its own entry, each entry having two values—a source location and a destination location. Yet another technique of encoding pre-fetch profiles 405, 410, and 415 is called elevator scheduling. Elevator Scheduling may be used in conjunction with the blocking method and the one-to-one method to accelerate the pre-fetching process described below. Elevator scheduling organizes the entries of each of pre-fetch profiles 405, 410, and 415 according to the physical position of the LBAs on DSU 301. In an example where DSU 301 represents HDD 120, elevator scheduling would arrange the order of the entries of pre-fetch profiles 405, 410, and 415 to match the physical order of the source locations on HDD 120. Elevator scheduling minimizes read times from DSU 301 by minimizing travel distance of a read head.

Yet another technique of encoding a pre-fetch profile is probability profiling. Using probability profiling a single pre-fetch profile is generated for multiple operating systems. A pre-fetch profile using probability profiling gathers the most common LBAs loaded during boot-up phases for several operating systems into one pre-fetch profile. The pre-fetch profile could be generated using various types of probability density functions. In one embodiment, a pre-fetch profile could be generated from on a learned set of fetches based on a number of access patterns to DSU 301 over time. In one embodiment, the learned set of fetches could be acquired via Bayesian learning. In other embodiments, the learned set of fetches could be acquired via k-means and other learning techniques based on observation of disk patterns to determine a probability density function of the most-probable accesses to DSU 301.

Figure 5:
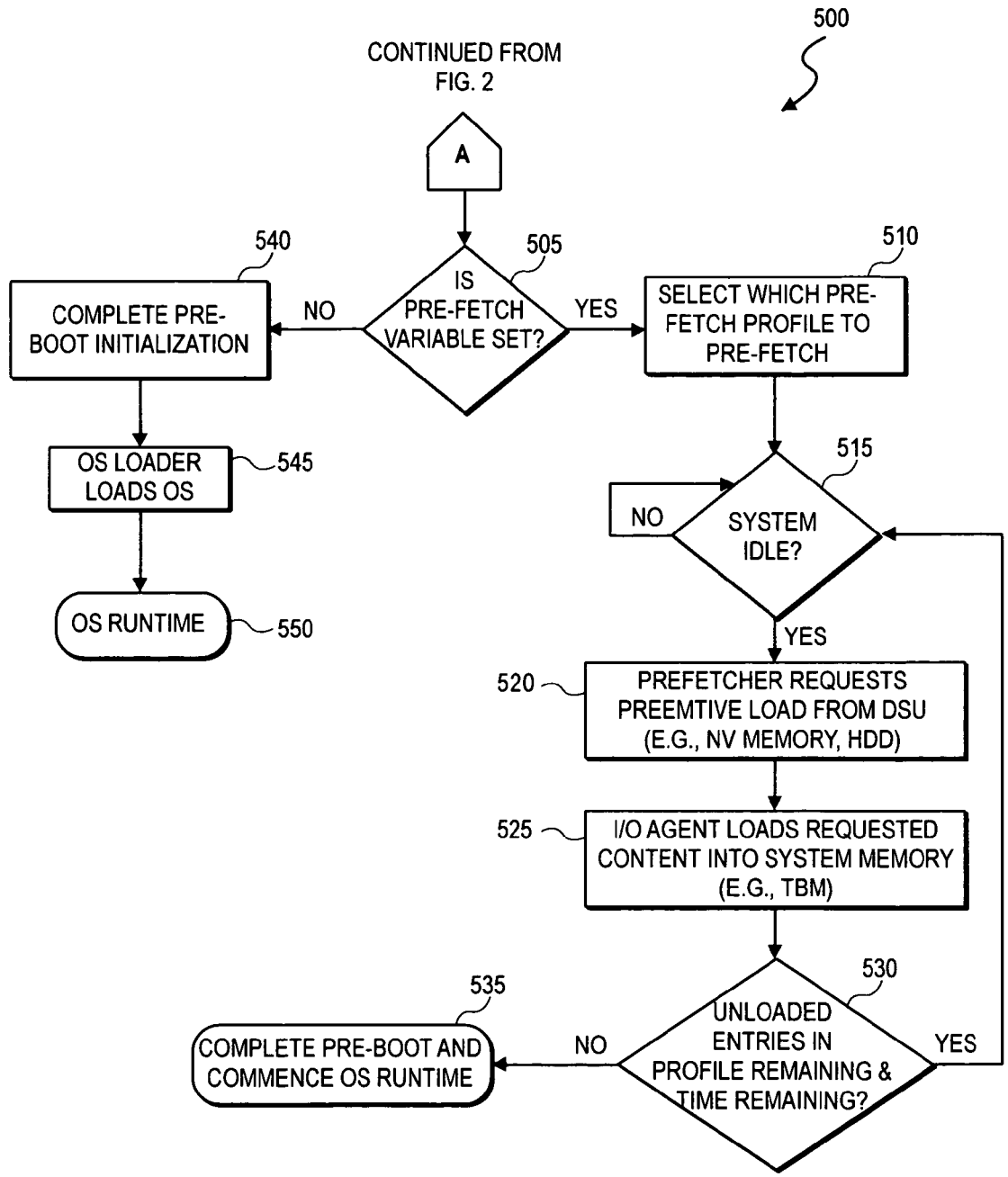
FIG. 5 is a flow chart illustrating a process to pre-fetch content from a data storage unit into system memory during a pre-boot runtime, in accordance with an embodiment of the present invention.
Figure 6:
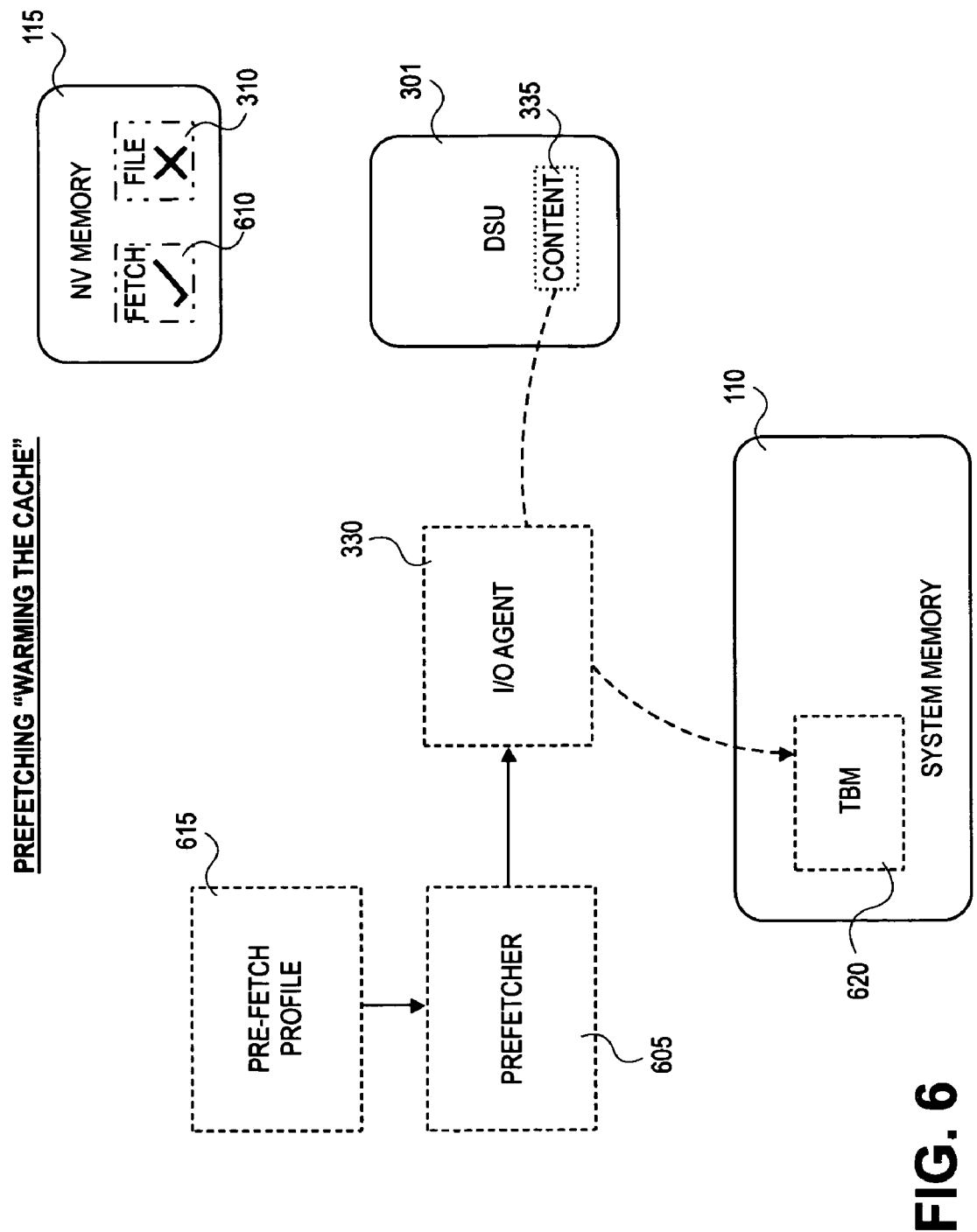
FIG. 6 is a block diagram illustrating data flow during a pre-fetching process, in accordance with an embodiment of the present invention.

FIG. 5 is a flow chart illustrating a process 500 to pre-fetch content 335 from DSU 301 into system memory 110 during a pre-boot runtime, in accordance with an embodiment of the present invention. In short, process 500 is a technique to pre-fetching content 335 from DSU 301 using pre-fetch profile 615 (e.g., one of pre-fetch profiles 405, 410, and 415). Process 500 is also referred to as "warming the cache" in anticipation of a booting process 700, described below. Process 500 is described in connection with FIG. 6. FIG. 6 is a block diagram illustrating data flow during process 500.

Returning to process 200 illustrated in FIG. 2, if profile variable 310 is not set (i.e., cleared), then process 200 continues to an off-page reference A. Process 500 continues from off-page reference A. In a decision block 505, a prefetcher 605 determines whether a pre-fetch variable 610 is set. In short, pre-fetcher 605 is a firmware agent which acts to preemptively load content 335 from DSU 301 into system memory 110 prior to content 335 being loaded in a natural course of the boot-up phase of processing system 100. Prefetcher 605 is enabled if pre-fetch variable 610 is set. In one embodiment, prefetcher 605 is loaded into system memory 110 from a persistent data storage device (e.g., NV memory 115, HDD 120, etc.) into system memory 110 and executed from there in response to pre-fetch variable 610 being set.

In a process block 510, prefetcher 605 determines which pre-fetch profile from pre-fetch profile library 400 to access. In one embodiment, pre-fetcher 605 may simply access the one of pre-fetch profiles 405, 410, and 415, which corresponds to the last OS loaded by processing system 100. Alternatively, in one embodiment, pre-fetcher 605 may access and pre-fetch content of several of pre-fetch profiles 405, 410, and 415 dependent upon system idle time available during the boot-up phase. In a case where pre-fetch profile library 400 includes only one pre-fetch profile process block 510 may be skipped. It should be appreciated that various other techniques may be implemented within the spirit of the present invention to determine which pre-fetch profile within pre-fetch profile library 400 to access. Referring to FIG. 6, pre-fetch profile 615 corresponds to the one of pre-fetch profiles 405, 410, and 415 accessed by prefetcher 605.

In a decision block 515, prefetcher 605 waits until processor 105 is busy waiting or idle. When it is determined that processor 105 is busy waiting or idle, then in a process block 520 prefetcher 605 requests I/O agent 330 to preemptively load content 335 into system memory 110 from DSU 301. Prefetcher 605 determines what content to load from DSU 301 based on pre-fetch profile 615. In a process block 525, I/O agent 330 loads the requested content 335 into system memory 110. In one embodiment, I/O agent 330 loads the requested content 335 into a temporary boot memory 620 within system memory 110. In one embodiment, temporary boot memory 620 is a boot services memory of the EFI standard framework. The boot services memory is valid only during the boot-up phase of processing system and upon entry into the OS runtime becomes stale, as the OS may reclaim the boot services memory at such time.

In an embodiment of the present invention where prefetcher 605 is compliant with an EFI standard framework, a boot services stall routine is often called for processing system 100 to busy wait on a timer while processor 105 waits for a hardware entity to initialize, return results, or the like. In one embodiment of the present invention, the boot services stall routine is augment with code to call prefetcher 605 to request preemptive loads of content 335 during this busy wait period. In this manner, the busy wait or idle periods are not wasted.

In a decision block 530, prefetcher 605 determine whether any entries remain in pre-fetch profile 615 which have not been preemptively loaded into system memory. If unloaded entries remain and the processing system 100 has not yet entered OS runtime (e.g., processor 105 has not yet executed an "exit boot services" instruction), then process 500 returns to decision block 515 and proceeds from there as described above. If on the other hand, all entries in pre-fetch profile 615 have been loaded or processing system 100 is about to complete the boot-up phase (i.e., no time remaining), then process 500 continues to a process block 535. In process block 535, the pre-boot runtime completes (e.g., processor 105 executes the "exit boot services" routine called by OS loader 325 in the EFI standard framework, launching of the active partition's boot record in a legacy system or the like), the OS claims control over processing system 100, and commences OS runtime.

Returning to decision block 505, if pre-fetch variable 610 is not set, then prefetcher 605 is not enabled and process 500 continues to a process block 540. In process block 540, processing system 100 completes a regular boot-up phase without pre-fetching content 335 from DSU 301. In a process block 545, OS loader 325 loads components of an OS (e.g., OS kernel, device drivers, etc.) into system memory 110 and processing system 100 commences OS runtime (process block 550).

Figure 7:
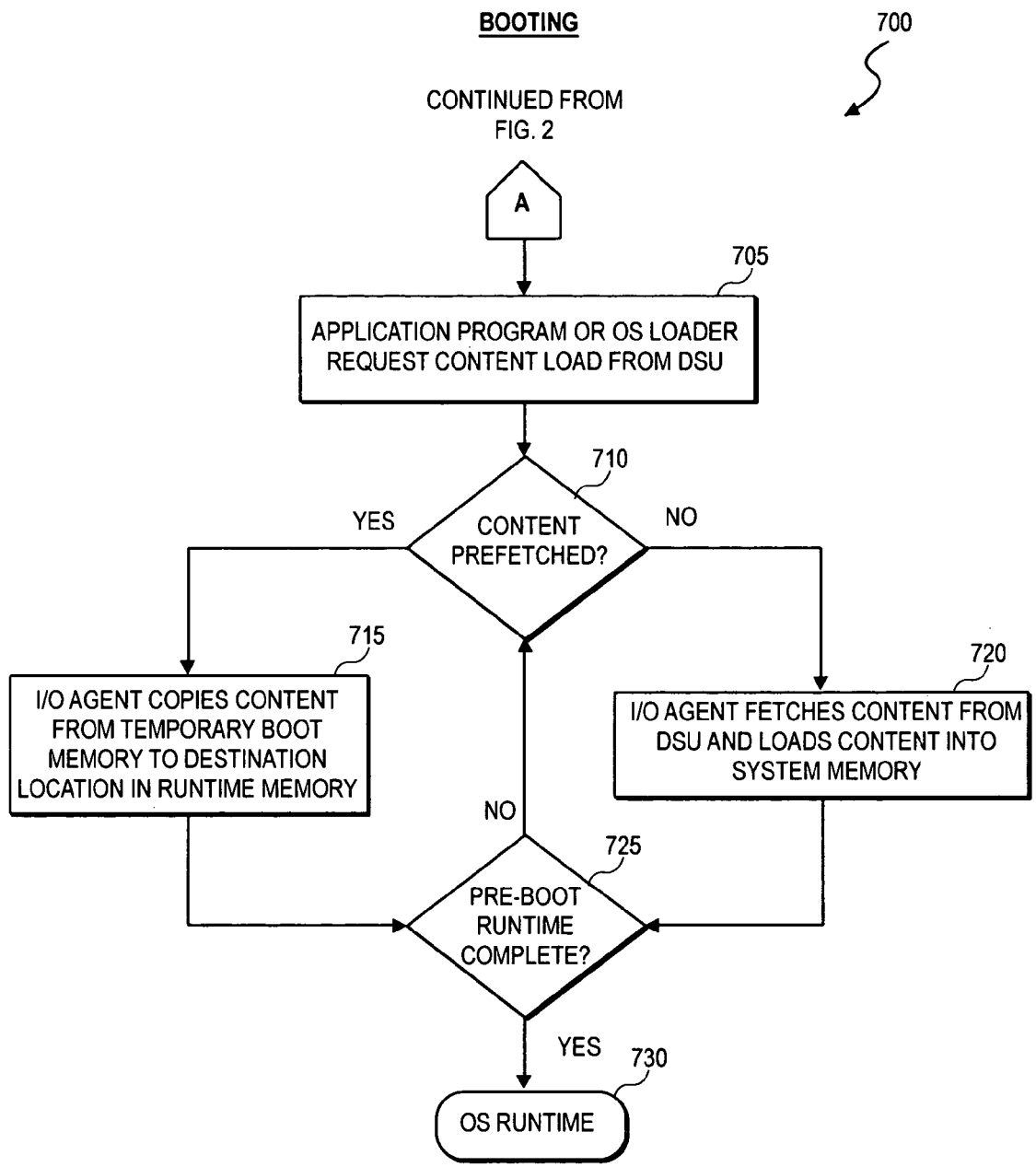
FIG. 7 is a flow chart illustrating a booting process using pre-fetched content, in accordance with an embodiment of the present invention.
Figure 8:
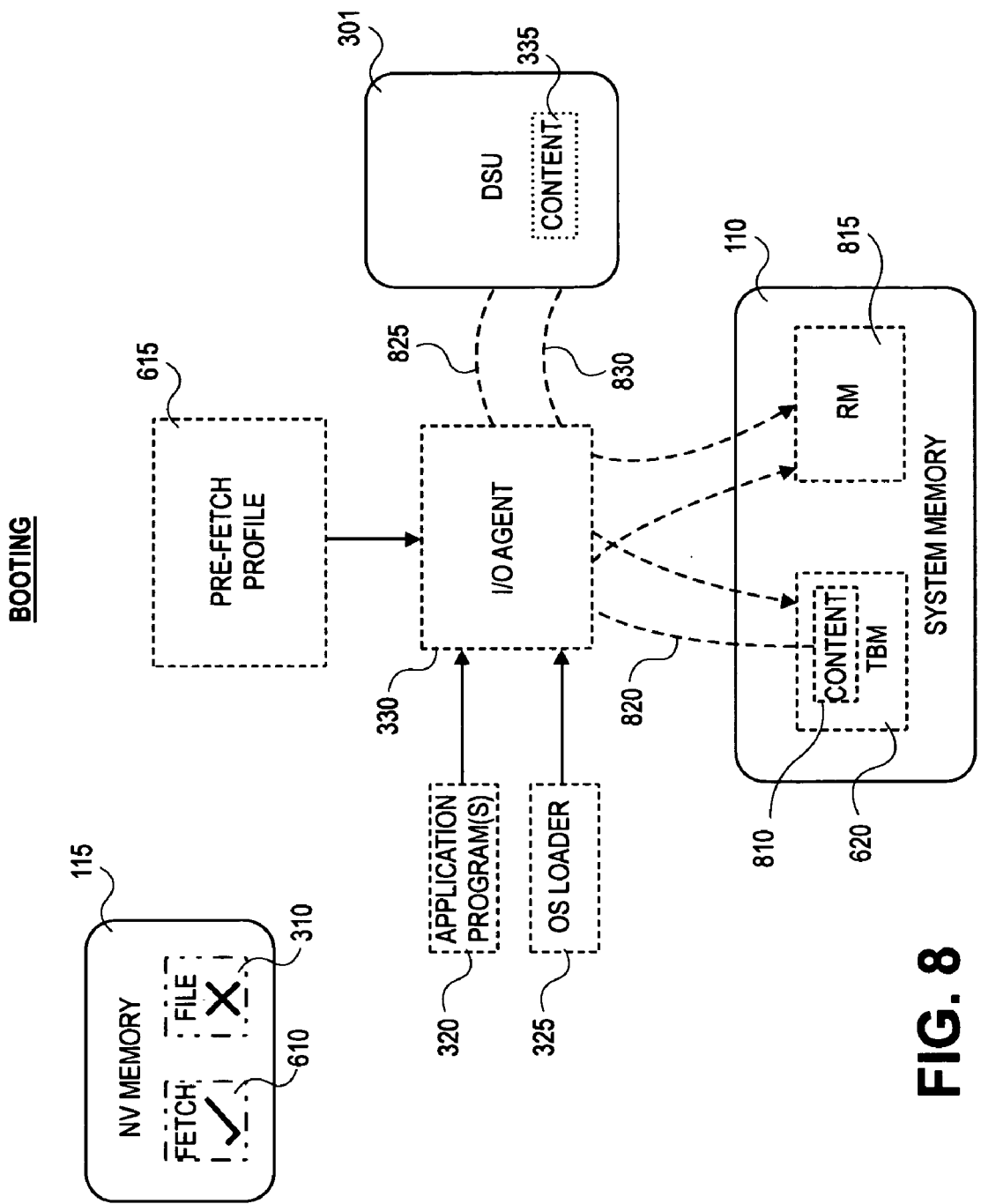
FIG. 8 is a block diagram illustrating data flow during a booting process where a portion of the boot content is pre-fetched, in accordance with an embodiment of the present invention.

FIG. 7 is flow chart illustrating a process 700 for booting processing system 100 using pre-fetched content, in accordance with an embodiment of the present invention. In one embodiment, process 700 executes concurrently with process 500. Process 700 is described in connection with FIG. 8. FIG. 8 is a block diagram illustrating data flow during process 700.

Process 700 continues from off-page reference A in FIG. 2. In a process block 705, one of application program 320 and OS loader 325 requests I/O agent 330 to load content from DSU 301 into system memory 110. In a decision block 710, I/O agent 330 determines whether the requested content corresponds to content 810, which has already been preemptively loaded into temporary boot memory 620. Content 810 represents a portion of content 335, which has already been preemptively loaded into system memory 110 via the techniques described in connection with process 500.

If the requested content does match a portion of content 810, then process 700 continues to a process block 715. In process block 715, I/O agent 330 copies the requested content (i.e., the corresponding portion of content 810) from temporary boot memory 620 into runtime memory 815, illustrated with arrow 820. In one embodiment, the requested content is copied into a destination location within runtime memory 815 as requested by application program 320 or OS loader 325. It should be appreciated that the techniques of the present invention may also be used to preemptively load application program 320 and OS loader 325 into system memory 110.

Returning to decision block 710, if the requested content does not correspond to a portion of content 810 (i.e., the requested content has not yet been preemptively loaded into system memory 110 or does not correspond to an entry within pre-fetch profile 615 and therefore will not be prefetched), then process 700 continues to a process block 720. In process block 720, I/O agent 330 fetches the requested content from DSU 301 and loads the requested content into system memory 110, illustrated by arrows 825 and 830. Depending upon whether the requested content is to be executed during the OS runtime or simply to be temporarily executed during the boot-up phase will determine where in system memory I/O agent 330 loads the requested content.

In a decision block 725, if the boot-up phase of processing system 100 is not yet complete, then process 700 returns to decision block 710 and proceeds from there as described above. If the boot-up phase is complete, then process 700 exits the pre-boot runtime and commences execution within the OS runtime (process block 730).

Embodiments of the present invention preemptively load (i.e., pre-fetch) content 335 from DSU 301 during a boot-up phase of processing system 100 thereby resulting in a speedy OS boot. Embodiments of the present invention take advantage of the busy waiting and/or time which processor 105 would otherwise be idle during the pre-boot runtime to preemptively load content from DSU 301 into system memory 110. Copying the pre-fetched content 810 from one location within system memory 110 to another is many times faster than loading content from DSU 301 into system memory 110. Thus, by preemptively loading content from DSU 301 during otherwise wasted time, the boot-up phase of processing system 100 is decreased.

Figure 9:
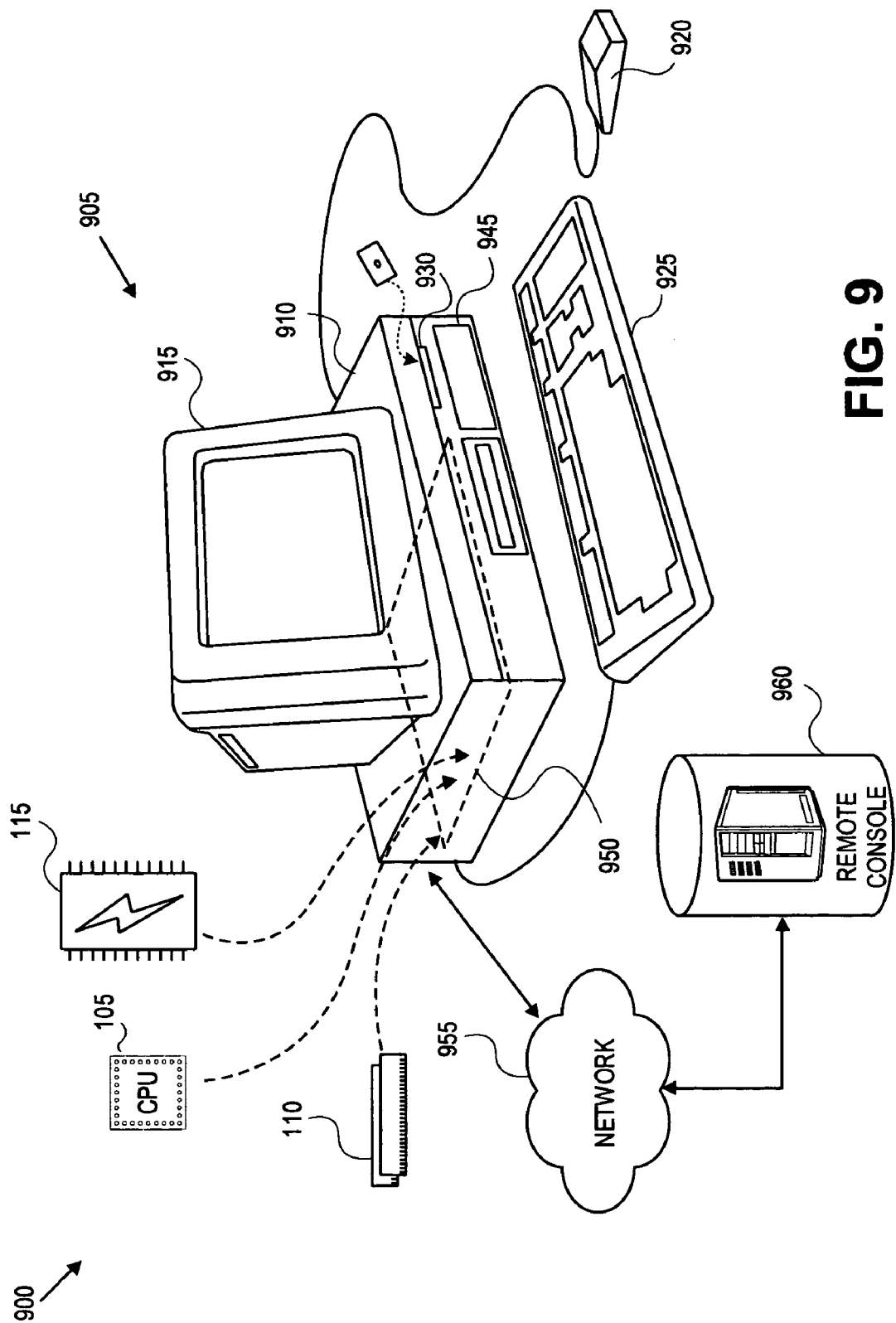
FIG. 9 a diagram of a system including an isometric view of a processing system to implement aggressive content pre-fetching during a pre-boot runtime, in accordance with an embodiment of the present invention.

FIG. 9 is a diagram of a system 900 including an isometric view of a processing system 905, in accordance with an embodiment of the present invention. Processing system 905 is one possible embodiment of processing system 100. The illustrated embodiment of processing system 905 includes a chassis 910, a monitor 915, a mouse 920 (or other pointing device), and a keyboard 925. The illustrated embodiment of chassis 910 further includes a floppy disk drive 930, a hard disk 945, a power supply (not shown), and a motherboard 950 populated with appropriate integrated circuits including system memory 110, NV memory 115, and one or more processors 105.

In one embodiment, a network interface card ("NIC") (not shown) is coupled to an expansion slot (not shown) of motherboard 950. The NIC is for connecting processing system 905 to a network 955, such as a local area network, wide area network, or the Internet. In one embodiment network 955 is further coupled to a remote computer 960, such that processing system 905 and remote computer 960 can communicate.

Hard disk 945 may comprise a single unit, or multiple units, and may optionally reside outside of processing system 905. Monitor 915 is included for displaying graphics and text generated by software and firmware programs run by processing system 905. Mouse 920 (or other pointing device) may be connected to a serial port, USB port, or other like bus port communicatively coupled to processor(s) 105. Keyboard 925 is communicatively coupled to motherboard 950 via a keyboard controller or other manner similar to mouse 920 for user entry of text and commands.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   loading content stored on a data storage unit ("DSU") of a processing system into system memory of the processing system to boot the processing system;
   recording source locations of the content stored on the DSU in response to the loading of the content stored at the source locations; and
   generating a pre-fetch profile including the source locations recorded while loading the content during booting of the processing system.

2. The method of claim 1 wherein the loading the content, the recording the source locations, and the generating the pre-fetch profile all occur during a pre-boot runtime of the processing system.

3. The method of claim 1 wherein recording the source locations comprises recording the source locations of the content stored on the DSU only if a profile variable is set and wherein generating the pre-fetch profile comprises generating the pre-fetch profile to store the source locations only if the profile variable is set.

4. The method of claim 3, further comprising clearing the profile variable after generating the pre-fetch profile.

5. The method of claim 1 wherein the content comprises applications executed by the processing system during a boot-up phase prior to an operating system taking control of the processing system.

6. The method of claim 5 wherein the content includes at least one of an operating system ("OS") loader, an OS kernel, and a device driver.

7. The method of claim 1, further comprising storing the pre-fetch profile to nonvolatile memory of the processing system.

8. The method of claim 1, further comprising:
   storing the pre-fetch profile to a pre-fetch profile library; and
   indexing the pre-fetch profile within the pre-fetch profile library to a particular operating system, the pre-fetch profile library including at least one other pre-fetch profile indexed to another operating system.

9. The method of claim 1, further comprising:
   loading the content stored on the DSU into system memory multiple times to boot the processing system multiple times; and
   recording the source locations of the content stored on the DSU multiple times, wherein generating the pre-fetch profile to store the source locations comprises generating the pre-fetch profile based on a probability density function of the multiple recordings of the source locations.

10. The method of claim 9 wherein the probability density function is further based on one of Bayesian learning and k-means.

11. A machine-accessible medium that provides instructions that, if executed by a machine, will cause the machine to perform operations comprising:
    loading content stored on a data storage unit ("DSU") of a processing system into system memory of the processing system to boot the processing system;
    recording source locations of the content stored on the DSU in response to the loading of the content stored at the source locations; and
    generating a pre-fetch profile including the source locations recorded while loading the content during booting of the processing system.

12. The machine-accessible medium of claim 11, further providing instructions that, if executed by the machine, will cause the machine to perform the operations wherein the loading the content, the recording the source locations, and the generating the pre-fetch profile all occur during a pre-boot runtime of the processing system.

13. The machine-accessible medium of claim 11, further providing instructions that, if executed by the machine, will cause the machine to perform further operations, comprising:
    storing the pre-fetch profile to a pre-fetch profile library; and
    indexing the pre-fetch profile within the pre-fetch profile library to a particular operating system, the pre-fetch profile library including at least one other pre-fetch profile indexed to another operating system.

* * * * *